United States Patent [19]

Kramer

[11] Patent Number: 4,802,430
[45] Date of Patent: Feb. 7, 1989

[54] COMPOSITE RUDDER SEAL

[75] Inventor: James H. Kramer, Akron, Ohio

[73] Assignee: The B. F. Goodrich Company, Akron, Ohio

[21] Appl. No.: 112,649

[22] Filed: Oct. 26, 1987

[51] Int. Cl.4 .............................................. B63B 3/40
[52] U.S. Cl. .................... 114/169; 114/162; 384/97; 384/295; 384/300
[58] Field of Search ................. 114/162, 169; 384/97, 384/98, 295, 300, 904

[56] References Cited

U.S. PATENT DOCUMENTS

| | | | |
|---|---|---|---|
| 3,455,613 | 7/1969 | McGrath | 384/97 |
| 3,455,619 | 7/1969 | McGrath | 384/98 |
| 3,743,306 | 7/1973 | Kramer | 277/187 |
| 3,919,962 | 11/1975 | Clay | 114/169 |
| 4,585,359 | 4/1986 | Kramer | 384/98 |
| 4,596,471 | 6/1986 | Kramer | 384/98 |

FOREIGN PATENT DOCUMENTS 1194285 6/1965 Fed. Rep. of Germany ...... 114/169
1129958 1/1957 France ................................ 114/169

Primary Examiner—Sherman D. Basinger
Assistant Examiner—Thomas J. Brahan
Attorney, Agent, or Firm—Joseph Januszkiewicz

[57] ABSTRACT

A bearing assembly for use on a rudder shaft of a vessel or boat wherein the shaft has a thin cylindrical rubber sleeve that encompasses it. The outer peripheral surface of the rubber sleeve is bonded to a fiberglass ring which is bonded to an elongated annular rubber member which is in sliding contact with the inner peripheral surface of a teflon ring which in turn is bonded to the inner peripheral surface of a fiberglass sleeve. The latter sleeve in turn is bonded to the inner periphery of the upper end of a housing that is attached to the hull of a vessel. The lower portion of the rudder shaft has secured to it an annular rubber bearing that is in frictional sliding contact with a teflon ring that is secured to the inner peripheral surface of the lower end of the housing.

9 Claims, 4 Drawing Sheets

COMPOSITE RUDDER SEAL

BACKGROUND OF THE INVENTION

This invention relates to shaft seals and more particularly to seal for use on an oscillating shaft subjected to fluid pressures.

Seals for oscillatory shafts such as for use on rudder shafts which are manually turned where fluid pressure is a constant factor have proved difficult because of the necessity to maintain a positive fluid tight seal between the rotative and stationary parts while requiring the maintenance of a minimal load therebetween. This is essential to permit ease of maneuvering of the steering shaft. It is important to provide a responsive feel to the turning of the rotative shaft without encountering a stiff or binding feel to the steering effort. The present seals for rudder shafts of smaller vessels generally use flex packing that is compressed between a rotating and stationary member. In time, the packing assumes a set and thereafter even though the compressive forces on the flex packing is increased there is a leakage problem. The leakage must be pumped or bailed from the hold of the vessel presenting an undesirable condition and one that requires the expenditure of time. The present invention provides a positive means for significantly extending the useful life cycle of the rudder seal while enhancing the responsiveness of the rudder shaft in its steering effort. Further, such sealing means permits the retrofitting of existing rudder sealing means in a facile manner.

SUMMARY OF THE INVENTION

A bearing assembly for use on the rudder shaft providing excellent sealing while permitting ease of maneuvering of the rudder shaft. The shaft is journaled in a cylindrical housing that is secured in a vertical position within the hull of the vessel. The shaft has a thin rubber sleeve encompassing it. The sleeve in turn has its outer peripheral surface bonded to a fiberglass ring which is bonded to an annular rubber member, which is under compression. The rubber member is in sliding contact with a ring made of antifriction material which is bonded to a fiberglass sleeve that is secured to the cylindrical housing. The lower portion of the rudder shaft has an annular rubber bearing secured to it which in turn is in frictional contact with a ring of antifriction material secured to the inner peripheral surface of the lower end of the housing. Such bearing assembly permits its use as a retrofitting bearing unit.

DETAILED DESCRIPTION

Figure 1:
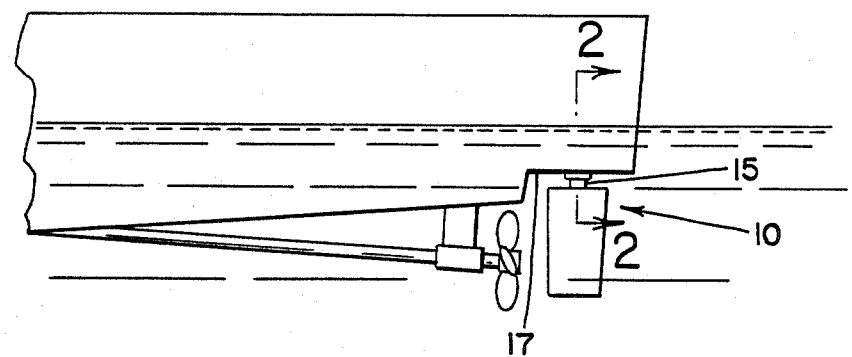
FIG. 1 is a side elevational view of the stern portion of a vessel showing the arrangement of the steering rudder.
Figure 2:
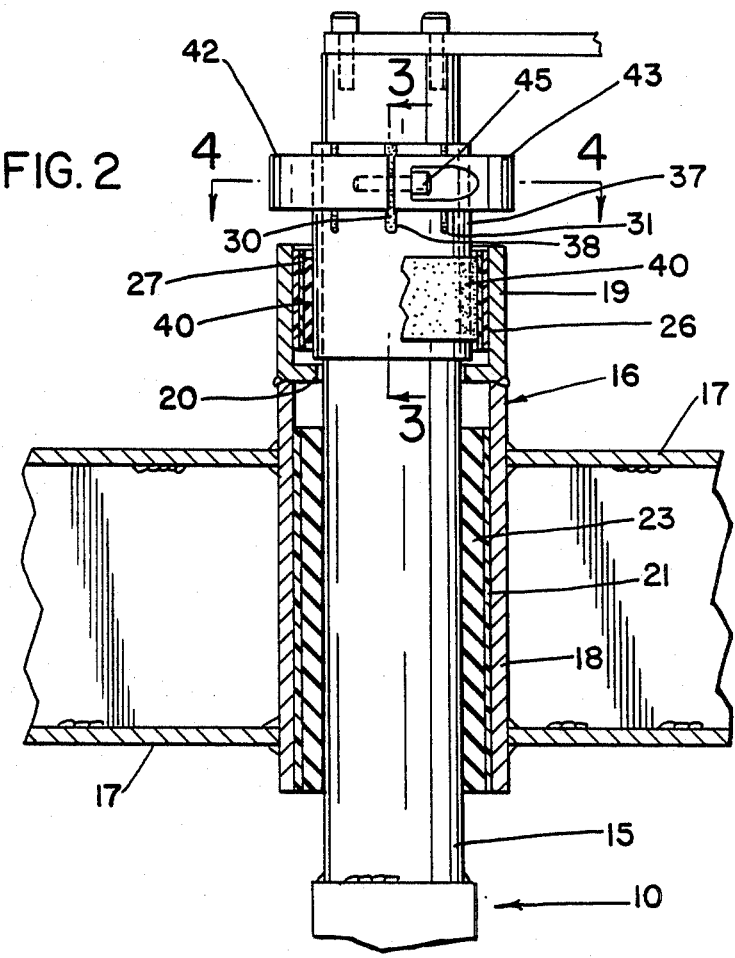
FIG. 2 is an enlarged sectional view taken on line 2—2 of FIG. 1 showing the details of the rudder shaft and the sealing means.

Referring to the drawings, wherein like reference numerals designate like or corresponding parts throughout the several views, there is shown in FIG. 1 (which illustrates a preferred embodiment), a ship's rudder or vessel rudder 10 attached pivotally to the vessel by a steering shaft 15 which operates against a bearing assembly enclosed in a tubular housing or outer pipe 16. As seen in FIG. 2 housing or outer pipe 16 is suitably attached, as by welding to the hull 17 of the ship or vessel. Housing or outer pipe 16 has a lower cylindrical portion 18 that extends through the hull and an upper cylindrical portion 19 with a flange 20 extending radially inwardly at the juncture of such upper cylindrical portion 19 and the lower cylindrical portion 18. The inner bore of the lower cylindrical portion 18 of pipe 16 has a thin ring made of antifriction material preferably of the type of material known as polytetrafloroethylene known by the trade name as Teflon 21 suitably adhered or cemented thereto. Mounted between the ring of antifriction material 21 and the outer periphery of the shaft 15 is an elongated rubber or elastomeric bearing 23 under compression. Rubber bearing 23, annular in shape is bonded to the shaft 15 and while being placed into position against the ring 21 of antifriction material is compressed sufficiently to permit it being located within the bore.

Figure 3:
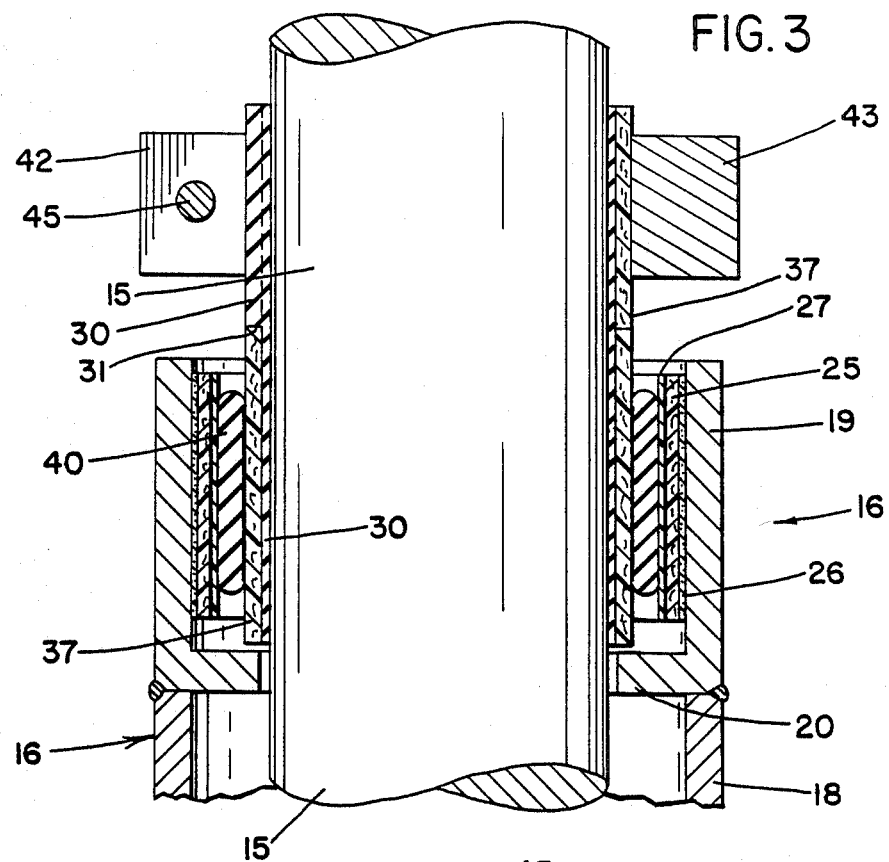
FIG. 3 is a further enlarged sectional view of the sealing means of the upper portion of the rudder shaft showing the sealing means in cross section taken on line 3—3 of FIG. 2.

The upper cylindrical portion 19 of outer pipe or tubular housing 16 has a fiberglass sleeve 25 cemented to its inner peripheral surface wherein the cement is designated as a film 26 (in FIG. 3). An annular ring 27 made of antifriction material preferably of the type of material known as polytetrafloroethylene known by the trade name as Teflon has its outer peripheral surface suitably bonded to the fiberglass sleeve 25 to provide a smooth stationary surface for the rotating seal to be described to slide on while maintaining a fluid tight seal.

The rotatable steering shaft 15 has an annular rubber sleeve 30 suitably mounted thereon substantially in alignment with the rubber sleeve or bearing 23 in the lower cylindrical portion 18 of pipe 16 and extending upwardly therefrom. Such rubber sleeve 30 is thicker on its upper end as seen in FIG. 3 to provide a shoulder 31 on its outer surface. A fiberglass ring 37 is formed onto the rubber sleeve 30 to thereby interconnect the fiberglass ring 37 and the rubber sleeve 30 into an integral unit to permit a sliding fit of the unit onto shaft 15. Fiberglass ring 37 has a plurality of circumferentially spaced slits 38 along its upper portion such that on bonding the rubber sleeve 30 onto fiberglass ring 37 will permit the rubber to flow into the slits 38 to assure an integral unitary whole. A rubber ring 40 is then placed onto the fiberglass ring 37 with its inner peripheral surface bonded to the lower portion of fiberglass ring 37 to form a complete unitary seal for the bearing assembly. Such bearing assembly can be used as a replacement unit as well as an original built unit. The rubber ring 40 is under compression after installation and has its outer surface in sliding contact with the ring 27 of antifriction material assuring a leakproof interior from the water surrounding the hull of the ship and the rudder 10 and its steering shaft 15. At assembly, the rubber ring 40 is compressed between 5 to 30% of its free thickness. The resulting pressure exceeds the water pressure that is attempting to enter the vessel's hull via the central bore in the cylindrical housing or outer pipe 16. The rubber ring 40 under the compressive forces exerts a force that is normal to the ring of antifriction material, which normal force must be overcome before the rubber ring 40 slips relative to the ring of antifriction material, however for small angular rotations of the rudder shaft 15, the rubber ring 40 will twist through an angle before it slips on the ring 27 of antifriction material thus enhancing the life of the bearing assembly described.

The upper portion of shaft 15, the rubber sleeve 30 and the fiberglass ring 37 are clamped between a pair of semi-circular members 42 and 43 by bolts 45 for suitable connection to the steering mechanism of shaft 15. With the upper portion of the fiberglass ring 37 slit as at 38 and these voids filled with rubber during the molding process of making ring 37 integral with annular rubber sleeve 30, the clamping by the semicircular members 42 and 43 assures a fluid tight fit while permitting the bearing assembly's use as a retrofit unit.

Figure 6:
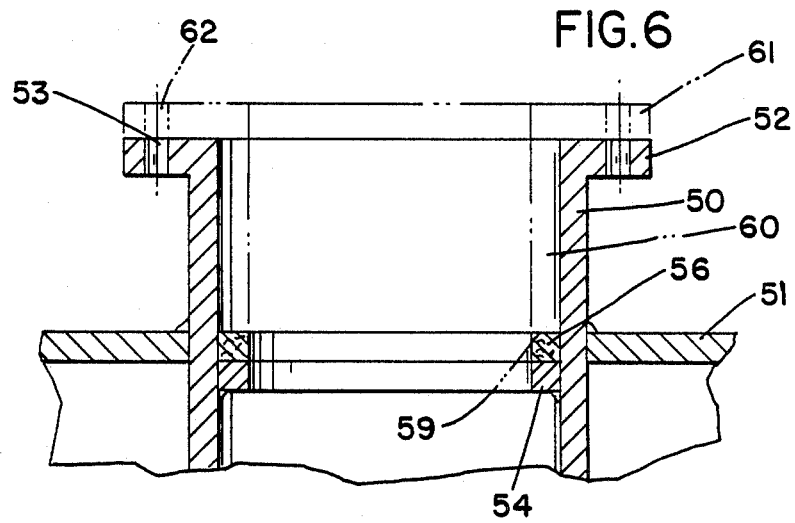
FIG. 6 is a fragmentary sectional view of a portion of a rudder shaft housing and hull similar to FIG. 2.
Figure 7:
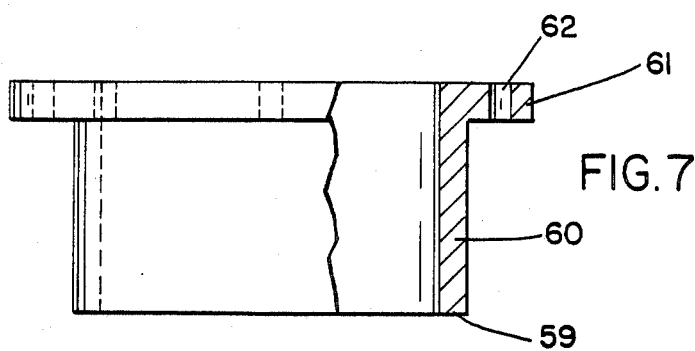
FIG. 7 is a side elevational view of a tubular support for use in the rudder shaft housing of FIG. 6.
Figure 8:
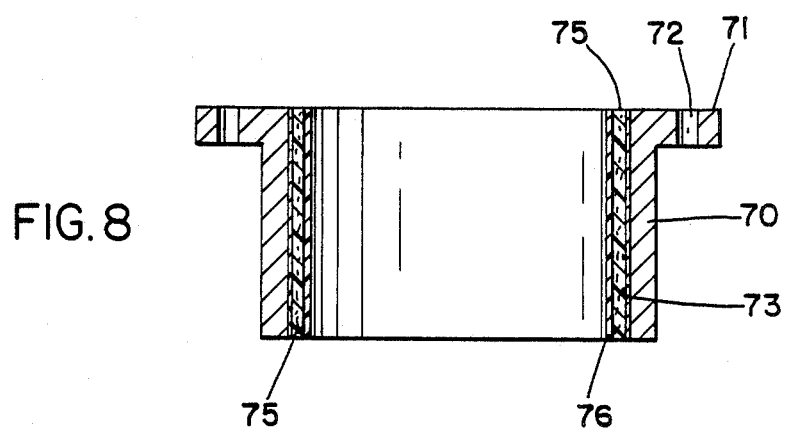
FIG. 8 is a side elevational view in cross-section of a tubular support made in accordance with the principles of the invention showing a modified form of the invention illustrated in FIGS. 1-5.
Figure 9:
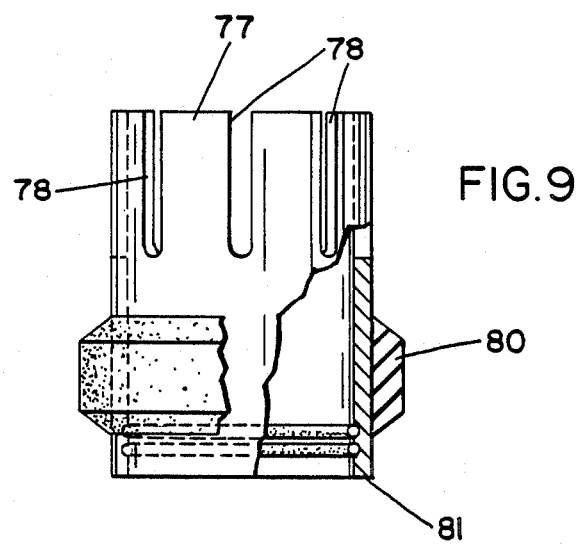
FIG. 9 is a side elevational view partly in cross-section of a rudder shaft seal and support for use with the tubular support of FIG. 8.

A modification of the above described invention is illustrated in FIGS. 7 and 8, which modification is particularly adapted for use in retrofitting the bearing assemblies of boats as illustrated in FIG. 6. Therein a housing or outer metal pipe 50 is suitably attached as by welding to the hull 51 of a ship or vessel. Such outer metal pipe 50 has an annular flange 52 with a plurality of circumferentially spaced bores 53. In such conventional construction of a bearing assembly, an annular ring 54 is located within the inner periphery of the outer metal pipe 50 connected thereto as by welding. Flax packing in the form of an annular flax ring 56 is positioned onto the annular ring 54 such that one end 59 of a cylindrical pipe 60 (FIG. 7) abuts the flax ring 56. Cylindrical pipe 60 has a flange 61 at the other end with a plurality of circumferentially spaced bores 62 in alignment with circumferentially spaced bores 53. In conventional practice the rudder shaft is inserted into the central bore of the cylindrical metal pipe 60, after pipe 60 is located on the housing or outer pipe 50, and as the cylindrical metal pipe 60 is drawn down onto outer pipe 50 by tightening the bolts that would interconnect the aligned bores 53 and 62, the one end 59 of metal pipe 60 would exert pressure of the flax packing ring 56 which in turn would flatten out and seal the rudder shaft. After numerous re-tightening of the bolts that interconnect the cylindrical metal pipe 60 and the outer metal pipe 50, annular flax packing ring 56 assumes a set and will no longer provide for the sealing of the rudder shaft. The modified seal of FIGS. 8 and 9 are substituted for the cylindrical pipe 60 and the flax packing ring 56. Shown in FIG. 8 is a cylindrical metal pipe 70 with a flange 71 on one end with a plurality of circumferentially spaced bores 72 and an inner bore 73. The inner surface of bore 73 of metal pipe 70 has a fiberglass ring 75 cemented thereto. Suitably mounted onto and secured to the inner peripheral surface of fiberglass ring 75 is a low friction ring 76 made of antifriction material preferably of the type of material known as polytetrafloroethylene known by the trade name as Teflon. Such metal pipe 70 with its inner fiberglass ring 75 and ring 76 of antifriction material is substituted for the outer metal pipe 60.

Figure 4:
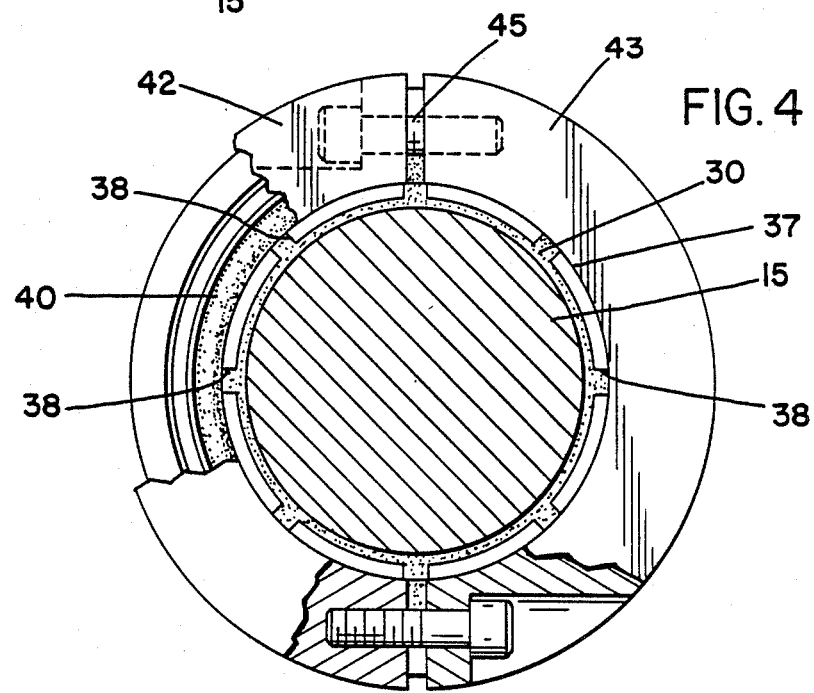
FIG. 4 is a plan view of the rudder shaft and housing taken on line 4—4 of FIG. 3.
Figure 5:
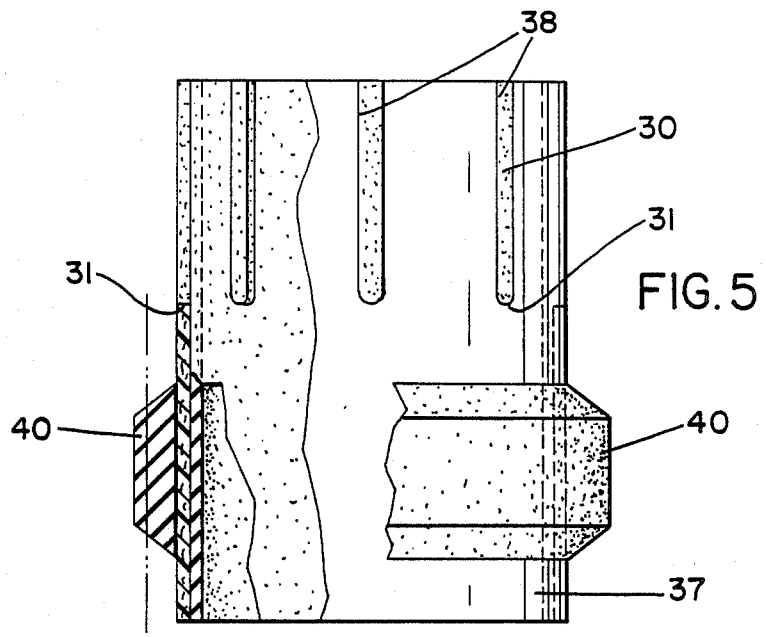
FIG. 5 is a side elevational view partly in cross section of the sealing means showing the tubular insert and its annular elastomeric seal.

A metal sleeve 77 with a plurality of slits 78 on one end has a rubber ring 80 suitably bonded to its outer surface close to the other end 81. The inner periphery of end 81 of metal sleeve 77 has a pair of annular grooves to accommodate a pair of spaced O-rings. Such sleeve 77 slips into the central bore of metal pipe 70 such that the rubber ring 80 is under compression and becomes elongated to fully seal the entrance of any water into the hull of the boat. A rudder shaft such as shaft 15 is slid into the bore of the sleeve 77 and connected thereto as by clamping action of semicircular members 42 and 43 (shown in FIGS. 3 and 4) via bolts 45 on the one end of such sleeve 77 that has the slits 78. Such bolting to the rudder shaft provides a cost effective means for retrofitting rudder seals such as flax packing rings on boats and vessels.

Various modifications are contemplated and may obviously be resorted to by those skilled in the art without departing from the described invention as hereinafter defined by the appended claims, as only preferred embodiments thereof have been disclosed.

I claim:

1. A bearing assembly for use with a steering rudder for a ship comprising a cylindrical housing with an upper portion and a lower portion, said cylindrical housing having a central bore therethrough, said lower portion having a sleeve of antifriction material bonded to the central bore thereof, a rudder shaft journaled in said central bore, said shaft having a thick annular rubber bearing member bonded thereto which slidingly engages said sleeve of antifriction material, said shaft having a thin rubber sleeve bonded to the upper portion thereto, a fiberglass sleeve bonded to said rubber sleeve, an annular rubber ring bonded to said fiberglass sleeve, the upper portion of said cylindrical housing having a fiberglass ring bonded to said central bore thereof, a ring of antifriction material bonded to said fiberglass ring for frictional sliding engagement with said rubber ring and for putting said rubber ring under compression.

2. A bearing assembly as set forth in claim 1 wherein said annular rubber member is an elongated member.

3. A bearing assembly as set forth in claim 2 wherein the juncture of said upper portion and said lower portion of said cylindrical housing have a radially inwardly extending annular flange, said annular flange having a bore with a predetermined diameter, said fiberglass sleeve secured to the upper portion of said shaft has an exterior diameter greater than said predetermined diameter of said flange to retain said rudder shaft in a vertical position in said central bore.

4. A bearing assembly for use with a steering rudder comprising a tubular housing with a central bore, said housing having a fiberglass sleeve bonded to said central bore, said fiberglass sleeve having an inner peripheral surface, said inner peripheral surface of said fiberglass sleeve having a Teflon ring adhered thereto, an oscillatable rudder shaft journaled in said tubular housing, said shaft having a thin elongated rubber sleeve encompassing the outer peripheral surface thereof, a fiberglass ring having its inner peripheral surface bonded to said rubber sleeve to form an integral unit with said rudder shaft, and an annular rubber member having its inner peripheral surface bonded to said fiberglass ring to provide a sliding contact between the outer peripheral surface of said rubber member and said teflon ring wherein said annular rubber member is placed under compression.

5. A bearing assembly as set forth in claim 4 wherein said fiberglass ring has its upper end slotted by a plurality of circumferentially spaced slots to facilitate the clamping of said fiberglass ring to said rudder shaft.

6. A bearing assembly as set forth in claim 5 wherein said plurality of circumferentially spaced slots are filled with a rubber integral to said thin elongated rubber sleeve encompassing said rudder shaft.

7. A bearing assembly as set forth in claim 6 wherein said rubber sleeve and said annular rubber member are vertically spaced and in axial alignment.

8. A replaceable bearing assembly for use with a steering rudder for a boat having a boat hull, a cylindrical pipe secured to said hull, said pipe having a flange secured to its exterior surface, said flange having a plurality of bores therein, a flanged metal pipe, said metal pipe having a tubular portion with a central bore, said flanged metal pipe secured to said flange of said cylindrical pipe, the outer periphery of said central bore of said metal pipe having an annular ring of fiberglass adhered thereto, a ring of low friction material adhered to the radially innermost surface of said fiberglass ring, a metal sleeve having an elongated annular elastomeric member bonded to the outer periphery thereof, said metal sleeve rotatably received by said central bore of said metal pipe with said annular member in compression and frictionally engaging said ring of low friction material, said metal sleeve being slotted, a rudder shaft received by said metal slotted sleeve, and clamp means secured to said slotted portion of said metal sleeve to secure said rudder shaft to said slotted sleeve.

9. A replaceable bearing assembly for use with a steering rudder for a boat as set forth in claim 8 wherein said cylindrical pipe has a central cylindrical opening therethrough, an annular ring located within said cylindrical opening and secured to the inner wall of said cylindrical pipe, said annular ring secured to said inner wall of said pipe spaced axially from said flange secured to said exterior surface of said cylindrical pipe, and said metal pipe having one end closely adjacent said annular ring secured to said inner wall of said pipe.

* * * * *